United States Patent
Krishan et al.

(10) Patent No.: US 12,289,379 B2
(45) Date of Patent: Apr. 29, 2025

(54) METHODS, SYSTEMS, AND COMPUTER READABLE MEDIA FOR INTEGRITY PROTECTION FOR SUBSCRIBE/NOTIFY AND DISCOVERY MESSAGES BETWEEN NETWORK FUNCTION (NF) AND NF REPOSITORY FUNCTION (NRF)

(71) Applicant: Oracle International Corporation, Redwood Shores, CA (US)

(72) Inventors: Rajiv Krishan, Bangalore (IN); Sonal Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 519 days.

(21) Appl. No.: 17/702,762

(22) Filed: Mar. 23, 2022

(65) Prior Publication Data
US 2023/0328145 A1    Oct. 12, 2023

(51) Int. Cl.
| | |
|---|---|
| H04L 67/51 | (2022.01) |
| H04L 9/32 | (2006.01) |
| H04L 9/40 | (2022.01) |

(52) U.S. Cl.
CPC ............ H04L 67/51 (2022.05); H04L 9/3247 (2013.01); H04L 63/0876 (2013.01); H04L 63/123 (2013.01); H04L 63/1416 (2013.01)

(58) Field of Classification Search
CPC ... H04L 67/51; H04L 9/3247; H04L 63/0876; H04L 63/123; H04L 63/1416;
(Continued)

(56) References Cited

U.S. PATENT DOCUMENTS

| | | | |
|---|---|---|---|
| 2010/0211793 A1* | 8/2010 | Park ................... | H04N 21/4623 713/181 |
| 2013/0132718 A1* | 5/2013 | Agrawal ............... | H04L 9/3268 713/178 |

(Continued)

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).

(Continued)

Primary Examiner — Abdulkader M Alriyashi
(74) Attorney, Agent, or Firm — Jenkins, Taylor & Hunt, P.A.

(57) ABSTRACT

A method for integrity protection for subscribe/notify and NF discovery transactions between an NF and an NRF includes receiving, from the NF, a subscribe or discovery request message, determining that the subscribe or discovery request message includes at least one indicator requesting NRF communications integrity protection, and computing an integrity check value of at least a portion of the subscribe or discovery request message and comparing the computed integrity check value to an integrity check value included in the subscribe or discovery request message. The method further includes determining that the computed integrity check value matches the integrity check value included in the subscribe or discovery request message, and formulating a response to the subscribe or discovery request message, generating and adding at least one digital signature to the response message, and transmitting the response message to the NF.

18 Claims, 7 Drawing Sheets

(58) Field of Classification Search
CPC . H04L 2209/80; H04L 9/3236; H04L 63/126; H04L 63/0884; H04W 12/084; H04W 12/106; H04W 12/108
See application file for complete search history.

(56) References Cited

U.S. PATENT DOCUMENTS

2020/0119909 A1  4/2020 Zhang et al.
2022/0224589 A1* 7/2022 Das ..................... H04L 41/0627

OTHER PUBLICATIONS

"3rd Generation Partnership Project; Technical Specification Group Services and System Aspects; Network Domain Security (NDS); Authentication Framework (AF) (Release 17)," 3GPP TS 33.310, V17.1.0, pp. 1-59 (Dec. 2021).

"3rd Generation Partnership Project; Technical Specification Group Services and System Aspects; Security architecture and procedures for 5G system (Release 17)," 3GPP TS 33.501, V17.4.2, pp. 1-287 (Jan. 2022).

Jones et al., "JSON Web Signature (JWS)," Request for Comments 7515, pp. 1-59 (May 2015).

Jones et al., "JSON Web Token (JWT)," Request for Comments 7519, pp. 1-30 (May 2015).

Hardt, "The OAuth 2.0 Authorization Framework," Request for Comments 6749, pp. 1-76 (Oct. 2012).

"NF Service Discovery Request Procedure", 3GPP TSG SA WG3 (Security) Meeting #90, S3-180164, pp. 1-3 (Jan. 2018).

"3rd Generation Partnership Project; Technical Specification Group Services and System Aspects; Study on enhanced security aspects of the 5G Service Based Architecture (SBA); (Release 18)", 3GPP TR 33.875, V1.1.0, pp. 1-51 (Feb. 2022).

"3rd Generation Partnership Project; Technical Specification Group Services and System Aspects; Security Aspects; Study on security aspects of the 5G Service Based Architecture (SBA) (Release 16)", 3GPP TR 33.855, V16.1.0. pp. 1-103 (Sep. 2020).

Notification of Transmittal of the International Search Report and the Written Opinion of the International Searching Authority, or the Declaration for International Patent Application Serial No. PCT/US2023/015144 (Jun. 26. 2023).

* cited by examiner

METHODS, SYSTEMS, AND COMPUTER READABLE MEDIA FOR INTEGRITY PROTECTION FOR SUBSCRIBE/NOTIFY AND DISCOVERY MESSAGES BETWEEN NETWORK FUNCTION (NF) AND NF REPOSITORY FUNCTION (NRF)

TECHNICAL FIELD

The subject matter described herein relates to integrity protection in 5G and other communications networks. More particularly, the subject matter described herein relates to methods, systems, and computer readable media for integrity protection for subscribe/notify and discovery messages between an NF and an NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that a hacker can gain access to communications between an NRF and an NF and manipulate parameters in the discovery response and notification messages to disrupt communications. The hacker can also gain access to discovery requests and subscription requests to manipulate parameters in the requests. 3GPP standards provide mechanisms for authentication between communicating entities. However, the existing authentication mechanisms do not prevent tapping and modification of communications between entities that have authenticated with each other.

Accordingly, in light of these and other difficulties, there exists a need for methods, systems, and computer readable media for integrity protection for subscribe/notify and discovery messages between an NF and an NRF.

SUMMARY

A method for integrity protection for subscribe/notify and network function (NF) discovery transactions between an NF and an NF repository function (NRF), includes, at the NRF, receiving, from the NF, a subscribe or discovery request message. The method further includes determining that the subscribe or discovery request message includes at least one indicator requesting NRF communications integrity protection. The method further includes, in response to determining that the subscribe or discovery request includes the at least one indicator requesting NRF communications integrity protection, computing an integrity check value of at least a portion of the subscribe or discovery request and comparing the computed integrity check value to an integrity check value included in the subscribe or discovery request. The method further includes determining that the computed integrity check value matches the integrity check value included in the subscribe or discovery request, and, in response, formulating a response message to the subscribe or discovery request message, generating at least one digital signature, adding the at least one digital signature to the response message, and transmitting the response message to the NF.

According to another aspect of the subject matter described herein, receiving the subscribe or discovery request message includes receiving an NF status subscribe message, formulating the response message includes formulating an NF status subscribe response message and generating the at least one digital signature includes digitally signing the integrity check value received in the NF status subscribe message from the consumer NF.

According to another aspect of the subject matter described herein, the method for integrity protection for subscribe/notify and NF discovery transactions between an NF and an NRF includes detecting an event requiring notification to the NF, generating a notification request message and including, in the notification request message, a digital signature of a body of the notification request message.

According to another aspect of the subject matter described herein, receiving the subscribe or discovery request message includes receiving an NF discovery request message, formulating the response message includes formulating an NF discovery response message, and generating the at least one digital signature includes generating a first digital signature of the integrity check value received in the NF discovery request message and a second digital signature of a body of the NF discovery response message.

According to another aspect of the subject matter described herein, the at least one indicator requesting NRF communications integrity protection includes a custom vendor_request_signing header having a value indicating that the NF expects digitally signed response messages.

According to another aspect of the subject matter described herein, the at least one indicator requesting NRF communications integrity protection includes a custom vendor_request_hash header containing the integrity check value and an identifier of an integrity check algorithm used to create the integrity check value.

According to another aspect of the subject matter described herein, the integrity check algorithm comprises a hash algorithm.

According to another aspect of the subject matter described herein, generating the digital signature includes generating the digital signature using a private key of the NRF that the NRF uses for OAuth 2.0 authorization.

According to another aspect of the subject matter described herein, generating the digital signature includes generating the digital signature using a private key that is paired with a public key of a public-private key pair specific to the NF.

According to another aspect of the subject matter described herein, receiving the subscribe or discovery request message includes receiving the subscribe or discovery request message from a different public land mobile network (PLMN) from the NRF and generating the at least one digital signature includes generating the at least one digital signature using a private key of a private-public key pair used to secure inter-PLMN communications.

According to another aspect of the subject matter described herein, a system for integrity protection for subscribe/notify and network function (NF) discovery transactions between an NF and an NF repository function (NRF) is provided. The system includes an NRF including at least one processor for receiving a subscribe or discovery request message. The system further includes a subscription/discovery communications integrity protector implemented by the at least one processor for determining that the subscribe or discovery request message includes at least one indicator requesting NRF communications integrity protection, in response to determining that the subscribe or discovery request message includes the at least one indicator requesting NRF communications integrity protection, computing an integrity check value of at least a portion of the subscribe or discovery request message, comparing the computed integrity check value to an integrity check value included in the subscribe or discovery request message, determining that the computed integrity check value matches the integrity check value included in the subscribe or discovery request message, and, in response, formulating a response message to the subscribe or discovery request message, generating at least one digital signature, adding the at least one digital signature to the response message, and transmitting the response message to the NF.

According to another aspect of the subject matter described herein, the subscribe or discovery request message includes an NF status subscribe message, the response message includes an NF status subscribe response message, and the at least one digital signature includes a digital signature of the integrity check value received in the NF status subscribe message from the consumer NF.

According to another aspect of the subject matter described herein, the NRF is configured to detect an event requiring notification to the NF and generate a notification request message and the subscription/discovery communications integrity protector is configured to include, in the notification request message, a digital signature of a body of the notification request message.

According to another aspect of the subject matter described herein, the subscribe or discovery request message includes an NF discovery request message, the response message includes an NF discovery response message, and the at least one digital signature includes a first digital signature of the integrity check value received in the NF discovery request message and a second digital signature of a body of the NF discovery response message.

According to another aspect of the subject matter described herein, the at least one indicator requesting NRF communications integrity protection includes a custom vendor_request_signing header having a value indicating that the NF expects digitally signed response messages.

According to another aspect of the subject matter described herein, the at least one indicator requesting NRF communications integrity protection includes a custom vendor_request_hash header containing the integrity check value and an identifier of a hash algorithm used to create the integrity check value.

According to another aspect of the subject matter described herein, the subscription/discovery communications integrity protector is configured to generate the digital signature using a private key of the NRF that the NRF uses for OAuth 2.0 authorization.

According to another aspect of the subject matter described herein, the subscription/discovery communications integrity protector is configured to generate the digital signature using a private key that is paired with a public key of a public-private key pair specific to the NF.

According to another aspect of the subject matter described herein, the subscribe or discovery request message originates from a different public land mobile network (PLMN) from the NRF and the subscription/discovery communications integrity protector is configured to generate the at least one digital signature using a private key of a public-private key pair used to secure inter-PLMN communications.

According to another aspect of the subject matter described herein, a non-transitory computer readable medium having stored thereon executable instructions that when executed by a processor of a computer control the computer to perform steps is provided. The steps are performed at a network function (NF) repository function (NRF). The steps include receiving, from an NF, a subscribe or discovery request message. The steps further include determining that the subscribe or discovery request message includes at least one indicator requesting NRF communications integrity protection. The steps further include, in response to determining that the subscribe or discovery request message includes the at least one indicator requesting NRF communications integrity protection, computing an integrity check value of at least a portion of the subscribe or discovery request message and comparing the computed integrity check value to an integrity check value included in the subscribe or discovery request message. The steps further include determining that the computed integrity check value matches the integrity check value included in the subscribe or discovery request message, and, in response, formulating a response message to the subscribe or discovery request message, generating a digital signature, adding the digital signature to the response, and transmitting the response message to the NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
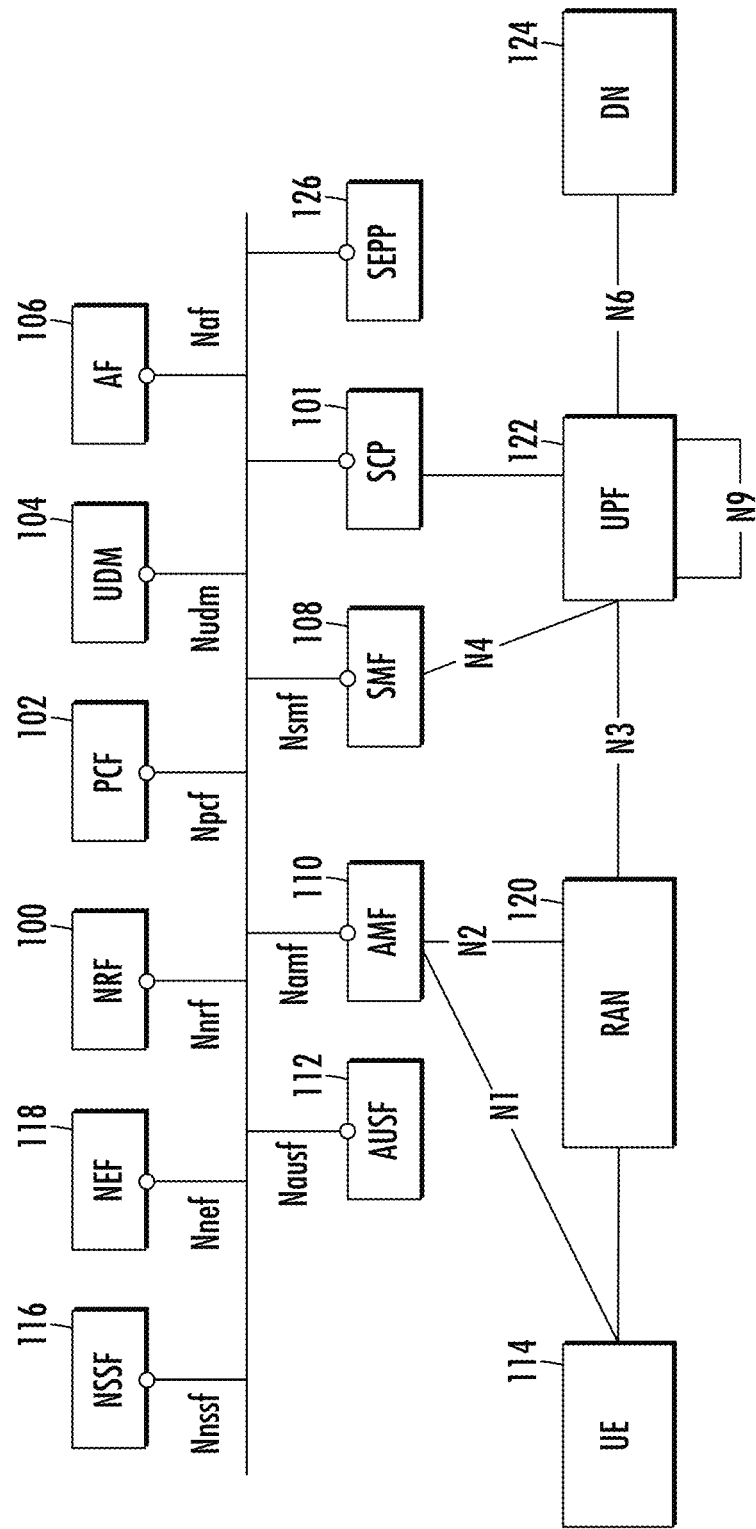
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a user defined unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that a hacker can tap service communications between an NRF and an NF, modify the communications, and disrupt service in the network. One operation that a hacker may be able to access and disrupt is the NFStatusSubscribe service operation described in Section 5.2.2.5 of 3GPP TS 29.510. The NFStatusSubscribe service operation is used to:

create a subscription so that an NF service consumer can request to be notified when NF instances of a given set, following certain filter criteria, are registered/deregistered/suspended in the NRF or when the profile of an NF instance is modified; and create a subscription to a specific NF instance so an NF service consumer can request to be notified when the profile of such NF instance is modified or when the NF instance is suspended/deregistered from the NRF.

Another service operation between the NRF and NFs for which it may be desirable to provide integrity protection is the NFStatusNotify service operation specified in Section 5.2.2.6 of 3GPP TS 29.510. The NFStatusNotify service operation notifies each NF service consumer that was previously subscribed to receive notifications of registration/deregistration of NF instances or notifications of changes of the NF profile of a given NF Instance. The notification is sent to a callback URI that each NF service consumer provided during the subscription (see NFStatusSubscribe operation in Section 5.2.2.5 of 3GPP TS 29.510).

Yet another service operation between the NRF and NFs for which it may be desirable provide integrity protection is the NFDiscover service operation specified in Section 5.3.2.2 of 3GPP TS 29.510. The NFDiscover service operation is used to discover NF profiles of NF instances in the set of NF Instances (and their associated NF service instances), represented by their NF profiles, that are currently registered in the NRF and satisfy a number of input query parameters.

3GPP and the IETF provide some authentication and security mechanisms for these and other service operations. For example, service operations use HTTP or HTTPS. HTTPS uses transport layer security to encrypt transport layer communications between endpoints. Physical network security can also be used to protect networks. Factors that complicate the protecting of integrity in communications between the NRF and NF include the fact that communication can be direct or through an SCP. In addition, one or more stateless or stateful proxies may be located between the NF and NRF endpoints.

Multiple connections between the NRF and the NF may enable a hacker to gain access to communications between the NRF and the NF. Using such unauthorized access, the hacker can, for subscription/discovery requests, tap into requests towards the NRF and manipulate the parameters in the requests. For notifications, the hacker can tap into notification requests from the NRF and manipulate the parameters in the notification body. The hacker can also push false notifications towards a consumer NF. For NF discovery service operations, the hacker can tap into discovery responses from the NRF and manipulate the parameters in discovery responses. Since NF discovery and notification results are used by NFs to make important decisions for routing, such vulnerability can disrupt the normal functioning of the 5G core network. Therefore, there is a need to enable integrity protection of notification requests and discovery responses from the NRF.

One existing authentication mechanism is defined in 3GPP TS 33.501, Section 13.3.1.2. For in indirect communication, the NF and the NRF may use one of the following methods for authentication:

Mutual authentication between the NF and NRF provided by the transport layer protection solution.

Client credentials assertion (CCA) based authentication as specified in clause 13.3.8.

NOTE 1: Client credentials assertion authentication is based on a CCA token sent by the NF service consumer to the NRF via an intermediate such as the SCP. CCA based authentication does not provide authentication of the NRF towards the NF service consumer or protection of the service request sent by the NF service consumer to the NRF.

Implicit, i.e. by relying on authentication between the NF service consumer and the SCP and between the SCP and the NRF, provided by the hop-by-hop security protection at the transport layer, NDS/IP, or physical security.

Figure 2:
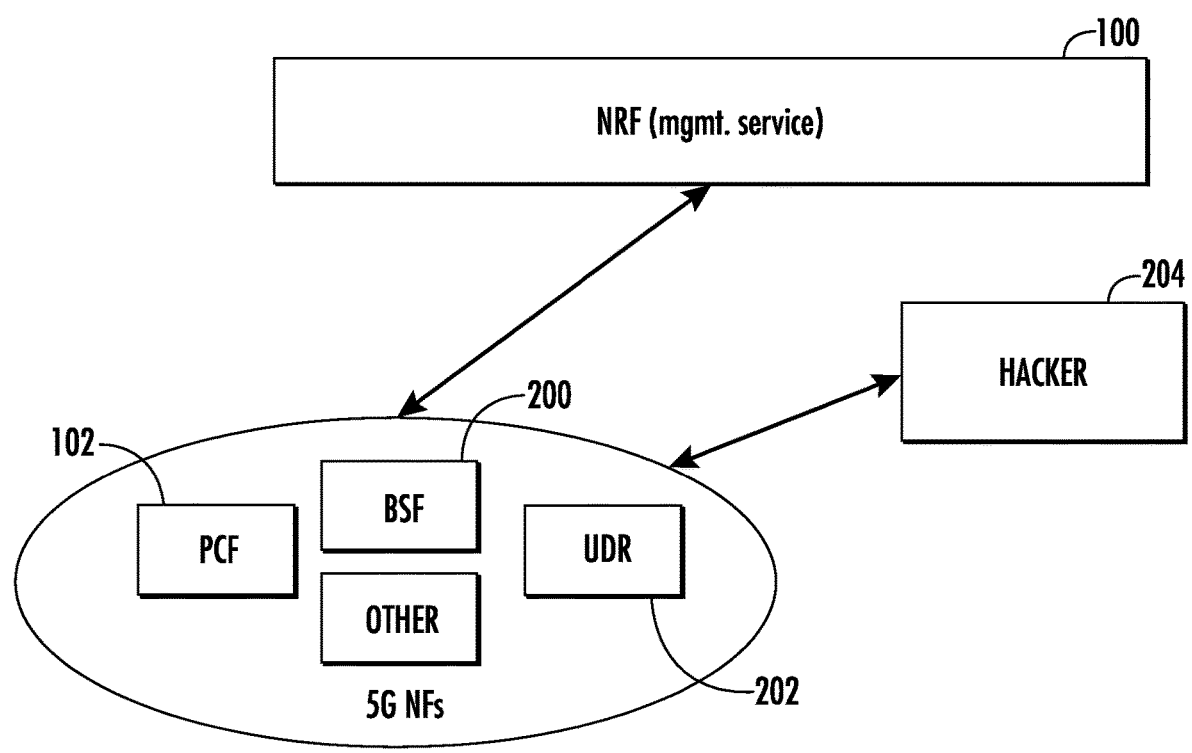
FIG. 2 is a network diagram illustrating 5G NFs, an NRF, and a hacker that may gain access to communications between the 5G NFs and the NRF, modify the communications, and disrupt service in the network.

FIG. 2 is a network diagram illustrating 5G NFs, an NRF, and a hacker that may gain access to communications between the 5G NFs and the NRF, modify the communications, and disrupt service in the network. referring to FIG. 2 NRF 100 provides management service to 5G NFs, such as PCF 102, binding support function (BSF) 200, unified data repository (UDR) 202, and other NFs. A hacker 204 can gain unauthorized access to communications between NRF 100 and the 5G NFs. For example, hacker 204 can modify response messages from NRF 100 to 5G NFs to include invalid data, which may disrupt service in the network. Hacker 204 can also modify request messages transmitted from the 5G NFs to NRF 100.

In light of the deficiencies with existing authentication mechanisms, the subject matter described herein includes a methodology for an NF service consumer to indicate to the NRF that the consumer NF expects signed responses from the NRF, and the NF will send an integrity check value with request messages to the NRF. When access token support is enabled, the NF has to have its serving NRF's key to perform validation of the access token. In one exemplary implementation of the subject matter described herein, the same key pair used for CCA signing and validation can be used for signing and validation of notification requests and discovery responses. In another exemplary implementation of the subject matter described herein, the NRF can be provisioned manually with a private key or through a public key infrastructure (PKI) in an operator's network, and a consumer NF may be provisioned with the corresponding public key. The NRF and the consumer NF may then use the public-private key pair for notification request and discovery response signing and validation.

To indicate the desire to participate in the integrity protection mechanism described herein, in a subscription or discovery request, an NF publishes the following additional data:

a custom header vendor_request_signing with value set 1 to indicate to the NRF that the NF is requesting signed notification requests and discovery responses. The NF can update its existing subscription to turn the signed message flow on or off by setting the value to 1 or 0, respectively; and a custom header with a vendor_request_hash attribute specifying a hash value (of the request body for a subscription request or of the query parameters for an NF discovery request)) and vendor_request_algo attribute specifying the algorithm for hashing, e.g., SHA256.

Optionally, if the NRF manages a separate key pair for each NfInstance/NfType/Locality, etc. pair, then the NF may publish its nfInstance id as "reqNfInstanceId" in SubscriptionData and "requester-nf-instance-id" in an NF discovery request. The nfInstanceId can be used by the NRF to select the appropriate private key for signing the messages (in case NRF manages a separate key pair for each NF instance). For a subscription request, when the NRF receives a request with the vendor_request_hash header, the NRF calculates the hash value of the request body for a subscription request using the algorithm identified by vendor_request_algo header. The NRF matches the hash value with the value in the vendor_request_hash header. If the hash value in the vendor_request_hash header does not match the hash value computed by the NRF, the NRF rejects the request. Otherwise, the NRF processes the request. If the hash value in the vendor_request_hash header matches the hash value computed by the NRF, the NRF adds a custom header vendor_signed_request (with a signed value of the hash value received in the vendor_request_hash header from the subscription request) to the subscription response. For a notification request towards an NF that has requested signed messages from the NRF, the NRF signs each message by generating a hash value of notification request body and digitally signing the hash value. The NRF publishes the digital signature as a JWS value using a custom header vendor_signed_body.

For an NF discovery request, when the NRF receives a request with a vendor_request_hash header, the NRF calculates the hash value of query parameters for the discovery request using the algorithm identified by the vendor_request_algo header. The NRF compares the hash value that the NRF calculated to the hash value in vendor_request_hash header. If the hash value computed by the NRF does not match the hash value in the vendor_request_hash header, the NRF rejects the request. If the hash value computed by the NRF matches the hash value in the vendor_request_hash header, the NRF processes the request, adds a custom header vendor_signed_request (with a signed value of hash value received in the vendor_request_hash header from the discovery request) in the discovery response, generates a hash value of discovery response body digitally signs the hash value, encodes the signature as a JSON web signature (JWS), and publishes the resulting JWS value using a custom header vendor_signed_body.

For a subscription response, the consumer NF validates the response by reading the JWS value from the vendor_signed_request custom header. The consumer NF validates the signature using the public key of the NRF, which, in one example, is the same public key used to validate OAuth 2.0 access tokens in service requests. Validating the digital signature includes decrypting the signed hash value using the public key provided by the NRF and verifying that the unsigned hash value is that same as the value that the consumer NF inserted in the vendor_request_hash header in the subscription request message. If validation of the subscription response fails, the consumer NF may re-subscribe, for example, with an alternate NRF. If validation of the subscription response is successful, the consumer NF processes the response.

For notification requests, the consumer NF performs validation by reading the JWS value from the vendor_signed_body custom header and validating the signature using its NRF's public key, which in one example is the same key used to validate OAuth 2.0 access tokens in service request messages. Validating the JWS value includes decrypting the signed hash value, computing the hash of the notification request message body, and determining whether the decrypted or unsigned hash value is the same as the hash of the notification request message body. If the validation fails, the consumer NF rejects the notification request with error code 401. If the hash values match, the NF processes the notification response and adds the notification data to its runtime content.

For discovery response validation, the consumer NF reads the JWS value from the vendor_signed_request custom header and validates the signature using its NRF's public key, which in one example is the same key used to validate OAuth 2.0 access tokens in service requests. The consumer NF validates that the decrypted or unsigned hash value in the discovery response message is the same hash value that the consumer NF inserted in the vendor_request_hash header in the discovery request. The consumer NF also validates the body of the NF discovery request message by reading the JWS value from the vendor_signed_body custom header and validating the signature using its NRF's public key, which in one example is the same key used to validate OAuth 2.0 access tokens in service requests. The consumer NF validates the discovery response body by computing the hash of the discovery response message body and comparing the computed hash to the unsigned or decrypted hash value from the JWS payload. If the hashes do not match, validation fails, and the consumer NF may resend the discovery request, for example, to an alternate NRF. If validation passes, the consumer NF processes the NF discovery response, extracts the NF profiles, and uses the NF profiles to select a producer NF to provide a service needed by the consumer NF.

Figure 3:
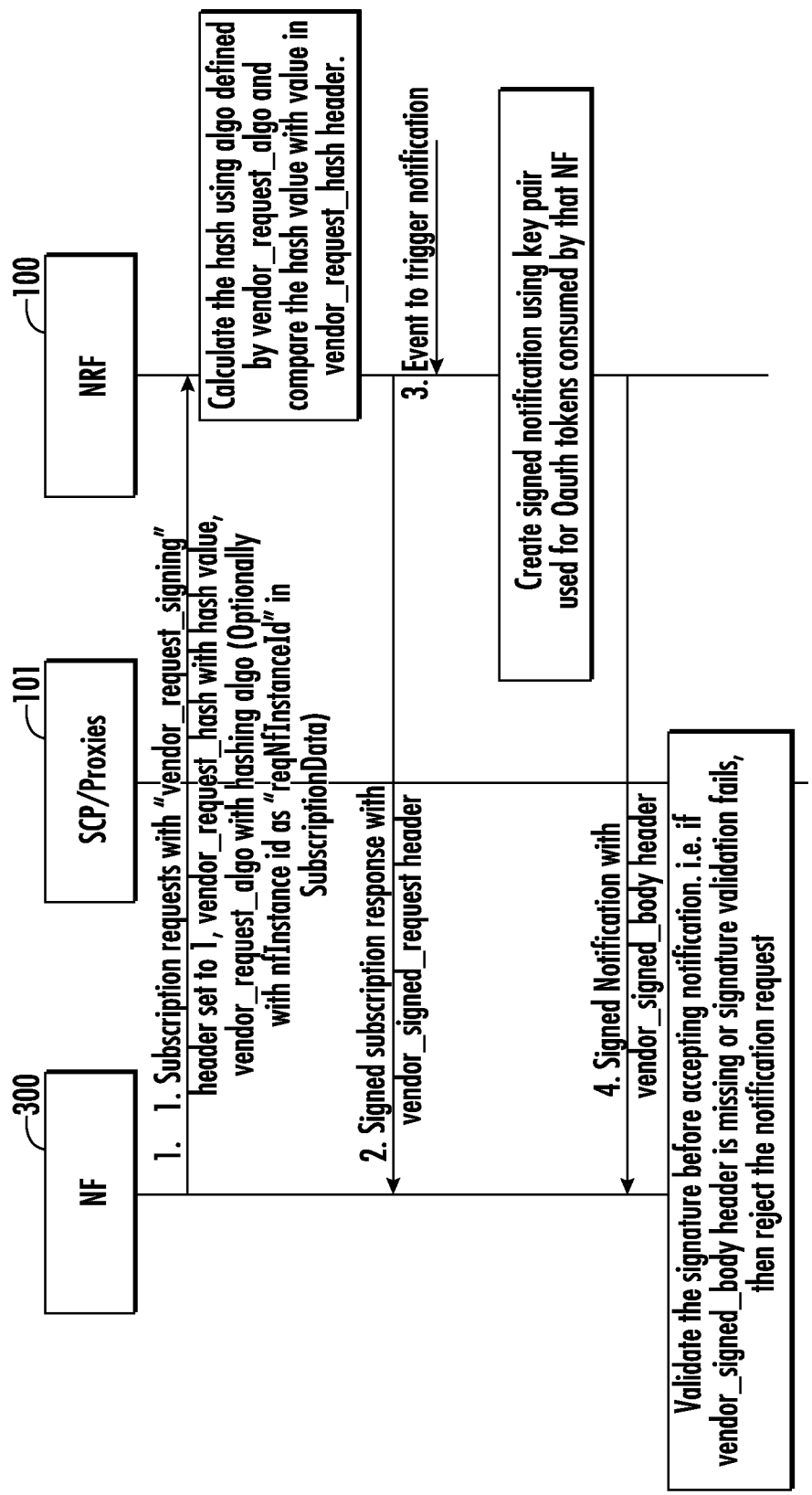
FIG. 3 is a message flow diagram illustrating exemplary messages exchanged in a subscription/notification transaction between an NF and an NRF in which integrity protection is used to detect unauthorized modification of the subscription request, the subscription response, and subsequent notification requests.

FIG. 3 is a message flow diagram illustrating exemplary messages exchanged in a subscription/notification transaction between an NF and an NRF in which integrity protection is used to detect unauthorized modification of the subscription request, the subscription response, and subsequent notification requests. Referring to FIG. 3, in line 1, consumer NF 300 sends a subscription request with the vendor_request_signing header set to 1 and the vendor_request_hash header including the hash of the subscription request message body and indicating the hash algorithm used to create the hash value. The subscription request may optionally include the NF instance ID of consumer NF 300 in the requestor NF instance ID attribute in the subscription data. NRF 100 receives the subscription request, computes a hash of the subscription request message body using the hash algorithm specified in the vendor request algorithm attribute of the vendor_request_hash header and compares the computed hash to the hash value in the vendor_request_hash header. In this example it is assumed that the hashes match. In line 2, NRF 100 sends a subscription response to consumer NF 300. In the subscription response, NRF 100 includes the vendor_signed_request header, which includes a digitally signed value of the hash value in the vendor_request_hash header received in the subscription request. Consumer NF 300 receives the subscription response message, reads the digital signature from the vendor_signed_request header, and validates the signature by using the NRF's public key to decrypt the signed value and verifying that the hash value included in the subscription response message is the same as the hash value that consumer NF 300 included in the vendor_request_hash header of the subscription request message. In this example, it is assumed that the subscription response message is valid.

In line 3 of the message flow diagram, NRF 100 detects an event that triggers a notification according to the parameters specified in the subscription created by the subscription request in line 1. In response to detecting the event, NRF 100 generates a signed notification response message using the private key used by NRF 100 for OAuth 2.0 authorization token generation by the NRF. In line 4, NRF 100 sends the notification request with the digitally signed hash of the notification request message body carried in the vendor_signed_body header. Consumer NF 300 receives the notification request, decrypts the signed hash value carried in the vendor_signed_body header, computes the hash of the notification request message body, and compares the unsigned or decrypted hash from the vendor_signed_body header to the computed hash value. If the values match, the notification request is validated, and consumer NF 300 processes the notification data in the notification request message body. If validation fails, consumer NF 300 may reject the notification request and attempt to create a subscription with the same or an alternate NRF instance.

Figure 4:
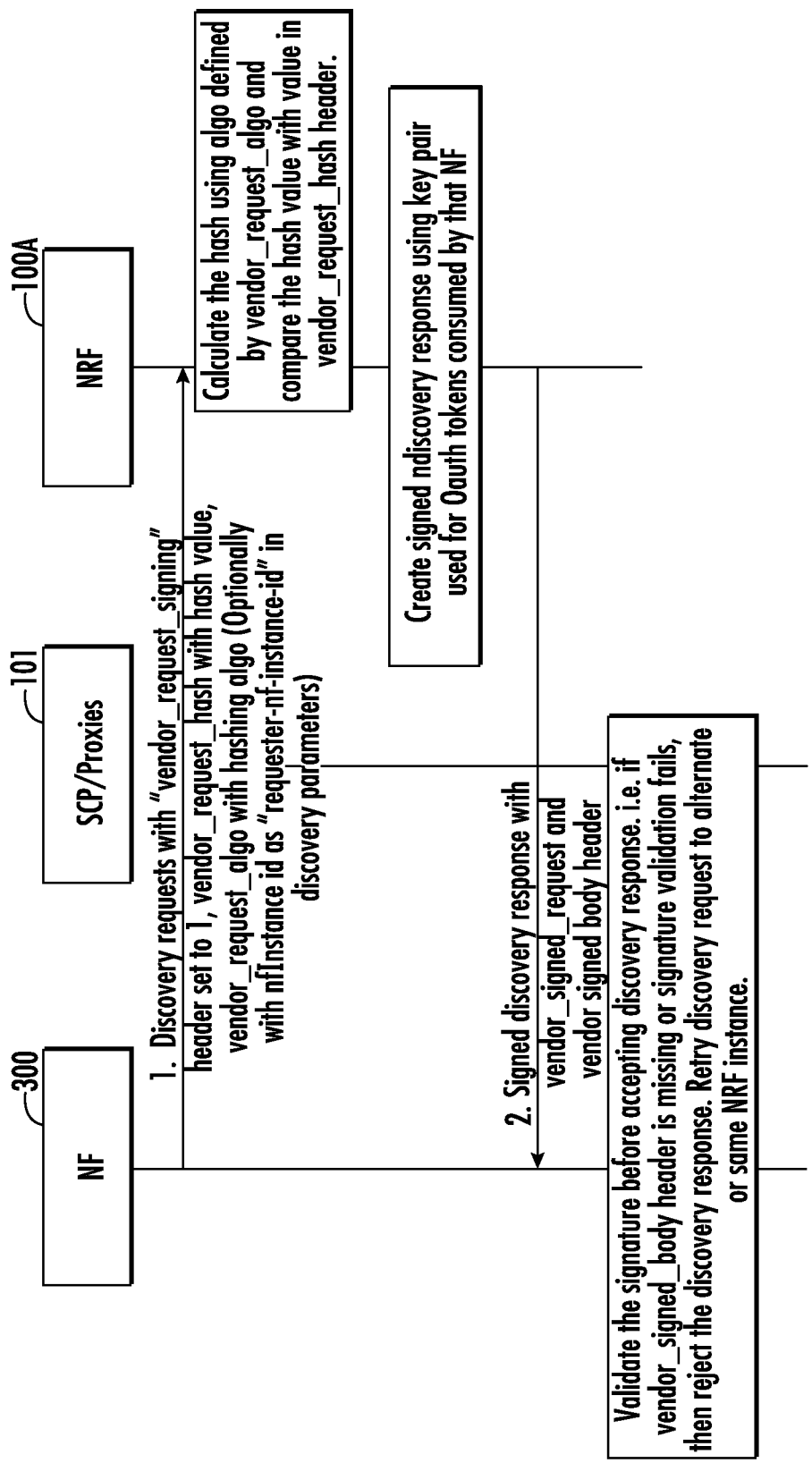
FIG. 4 is a message flow diagram illustrating exemplary messages exchanged in an NF discovery transaction between an NF and an NRF in which integrity protection is used to detect unauthorized modification of the NF discovery request and/or the NF discovery response.

FIG. 4 is a message flow diagram illustrating exemplary messages exchanged in an NF discovery transaction between an NF and an NRF in which integrity protection is used to detect unauthorized modification of the NF discovery request and/or the NF discovery response. Referring to FIG. 4, in line 1, consumer NF 300 sends an NF discovery request with the vendor_request_signing header set to 1 and the vendor_request_hash header including the hash of the query parameters in the discovery request message and indicating the hash algorithm used to create the hash value. The NF discovery request may optionally include the NF instance ID of consumer NF 300 in the requestor NF instance ID attribute in the discovery parameters. NRF 100 receives the NF discovery request, computes a hash of the query parameters using the hash algorithm specified in the vendor request algorithm attribute of the vendor_request_hash header and compares the computed hash to the hash value in the vendor_request_hash header. In this example, it is assumed that the hashes match. In line 2, NRF 100 sends an NF discovery response to consumer NF 300. In the NF discovery response, NRF 100 includes the vendor_signed_request header, which includes a digitally signed value of the vendor_request_hash header received in the NF discovery request and the vendor_signed_body header carrying the hash of the discovery response message body. Consumer NF 300 receives the NF discovery response message, reads the digital signature from the vendor_signed_request header, reads the digital signature from the vendor_signed_body header and validates both signatures using the NRF's public key. Validating the digital signature in the vendor_signed_request header includes decrypting the hash value in the vendor_signed_request header using the public key and comparing the decrypted or unsigned hash value to the hash value that consumer NF 300 inserted in the discovery request message. Validating the digital signature in the vendor_signed_body header includes decrypting the hash value in the vendor_signed_body header using the NRF's public key, computing the hash of the discovery response message body, and comparing the decrypted or unsigned hash value to the computed hash value. In this example, it is assumed that the NF discovery response message is valid. If validation of either digital signature fails, consumer NF 300 rejects the NF discovery response and retries NF discovery with the same or an alternate NRF.

In one example of the subject matter described herein, the NRF may sign discovery and subscription response messages using the same procedures for signing specified in Section 5.4.2.2 of 3GPP TS 29.510 and IETF RFC 7515. According to Section 5.4.2.2, the NRF functions as an OAuth 2.0 authorization server that provides signed OAuth 2.0 access tokens to NF service consumers. The access token is a JSON web token (JWT) specified in IETF RFC 7519. The NRF digitally signs the access token as specified in IETF RFC 7515.

In one implementation of the subject matter described herein, the NRF uses the same private key and algorithm as used to sign an access token for a respective NF as service provider. As defined by IETF RFC 7515:

JWS is a digital signature created using following logical values:
  JOSE header (i.e., protected header) as
    "typ" set to "TEXT"
    "alg" as defined by operator (for NRF access token)
  JWS Payload (described above)
  JWS Signature
    The NRF may use the same algorithm and private key to sign notification and discovery responses as used by the NRF to create the JWS signature for and access token for an NF.
JWS Compact Serialization:
  BASE64URL (UTF8 (JWS Protected Header))||'·'||
  BASE64URL (JWS Payload)||'·'|
  BASE64URL (JWS Signature)

According to another aspect of the subject matter described herein, the NRF may provide integrity protection for subscription and notification responses sent to consumer NFs in a different PLMN from the NRF. As per Section 5.2.2.6.3 of 3GPP TS 29.510, notification from the home NRF is directly delivered to consumer NF in the serving PLMN. Unless there is cross-certification process established between the two PLMNs (through mechanism discussed in 3GPP TS 33.310), a consumer NF in the serving PLMN may not request signed notification requests from NRFs across PLMNs. If a cross-certification process is established between the two PLMNs, then the consumer NF (in the serving PLMN) may follow the same procedure as with its local NRF for subscription and validation of notification requests. For inter-PLMN cases, the consumer NF does not need to provide the reqNfInstanceId in SubscriptionData as described above. However, as per 3GPP specifications, for inter-PLMN subscriptions, the NF must provide the reqPlmnList in SubscriptionData. The NRF may use a pre-agreed private key to sign the notification requests for a given PLMN identified from the reqPlmnList parameter in a subscription request.

Figure 5:
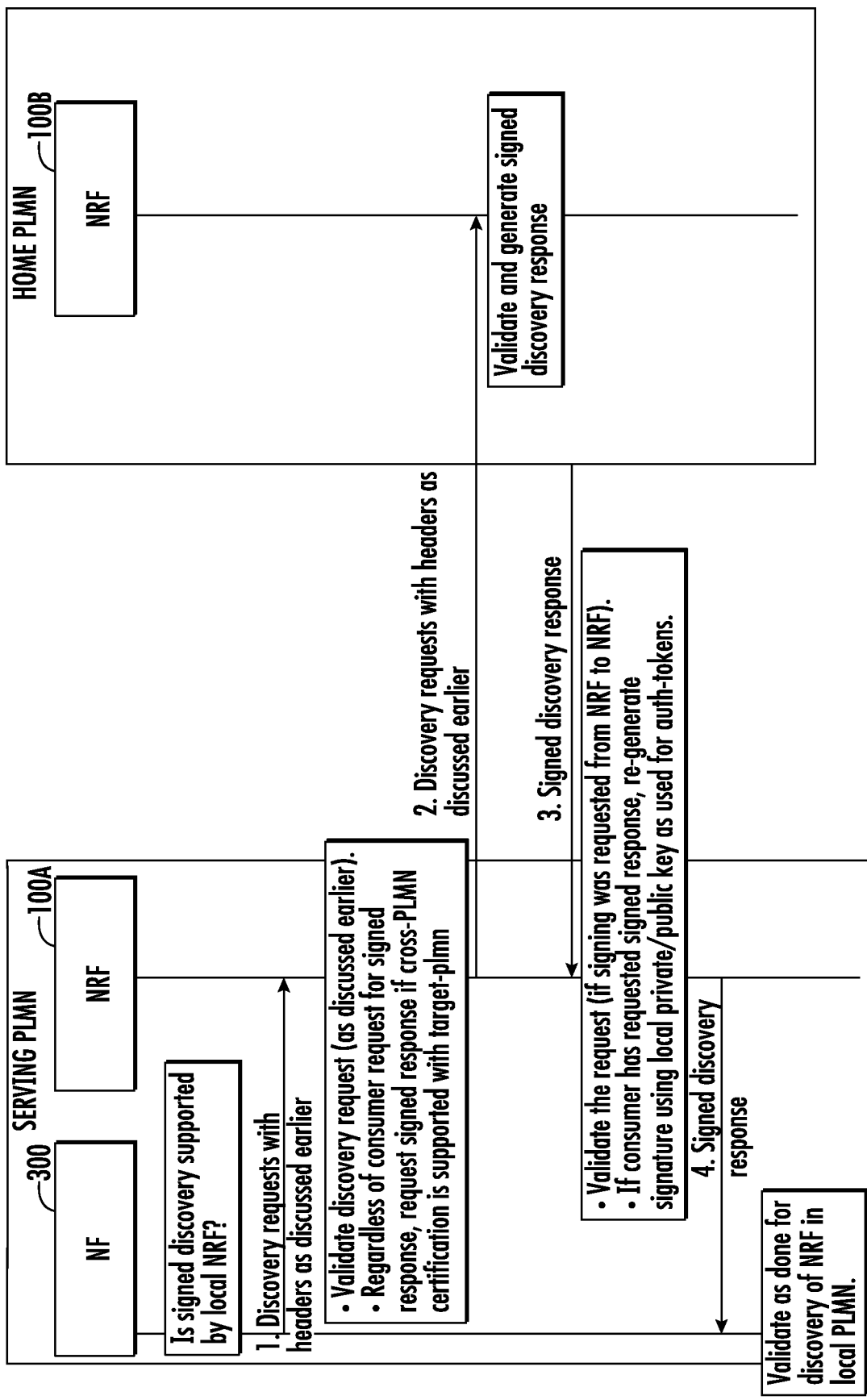
FIG. 5 is a message flow diagram illustrating exemplary messages exchanged in an inter-PLMN NF discovery transaction between an NF and an NRF in which integrity protection is used to detect unauthorized modification of the NF discovery request and/or the NF discovery response.

FIG. 5 is a message flow diagram illustrating exemplary messages exchanged in an inter-PLMN NF discovery transaction between an NF and an NRF in which integrity protection is used to detect unauthorized modification of the NF discovery request and/or the NF discovery response. Referring to FIG. 5, in line 1, if signed NF discovery is supported by the local NRF, consumer NF 300 sends an NF discovery request with the vendor_request_signing header set to 1 and the vendor_request_hash header including the digitally signed hash of the query parameters and indicating the hash algorithm used to create the hash value. The NF discovery request may optionally include the NF instance ID of consumer NF 300 in the requestor NF instance ID attribute in the discovery parameters. NRF 100A receives the NF discovery request, computes a hash of the query parameters using the hash algorithm specified in the vendor request algorithm attribute of the vendor_request_hash header, decrypts the hash value in the vendor_request_hash value and compares the computed hash to the decrypted hash value from the vendor_request_hash header. In this example, it is assumed that the hashes match. NRF 100A determines the NF discovery request needs to be forwarded to an NRF 100B in another PLMN. NRF 100A also determines that cross-PLMN certification is supported by the network of NRF 100B. In this example, it is assumed that the PLMN of NRF 100B supports cross-PLMN certification, and, in line 2, formulates and sends, regardless of whether the consumer NF requested signed discovery responses, an NF discovery request requesting signed discovery responses to NRF 100B. The NF discovery request includes the vendor_request_signing header and the vendor_request_hash header including a hash of the query parameters signed using a private key of a private-public key pair used by the PLMN of NRF 100B to validate inter-PLMN discovery requests. NRF 100B validates the digital signature in the inter-PLMN discovery request, and, in line 3 NRF 100B sends a signed NF discovery response to NRF 100A. The NF discovery response includes the vendor_signed_request header carrying the digitally signed hash received in the NF discovery request and the vendor_signed_body header carrying the hash of the message body of the discovery response message. NRF 100A validates the digital signatures in the NF discovery response using the public key corresponding to the private key used for inter-PLMN validation, and, in line 4, generates and sends an NF discovery response to consumer NF 300. In the NF discovery response, NRF 100A includes the vendor_signed_request header, which includes a digitally signed value of the vendor_request_hash header received in the NF discovery request and the vendor_signed_body header carrying the digitally signed value of the NF discovery response message body. Consumer NF 300 receives the NF discovery response message, reads the digital signatures and validates the digital signatures using the local NRF's public key. In this example, it is assumed that the NF discovery response message is validated. If validation of either of the digital signatures fails, consumer NF 300 rejects the NF discovery response and retries NF discovery with the same or an alternate NRF.

Figure 6:
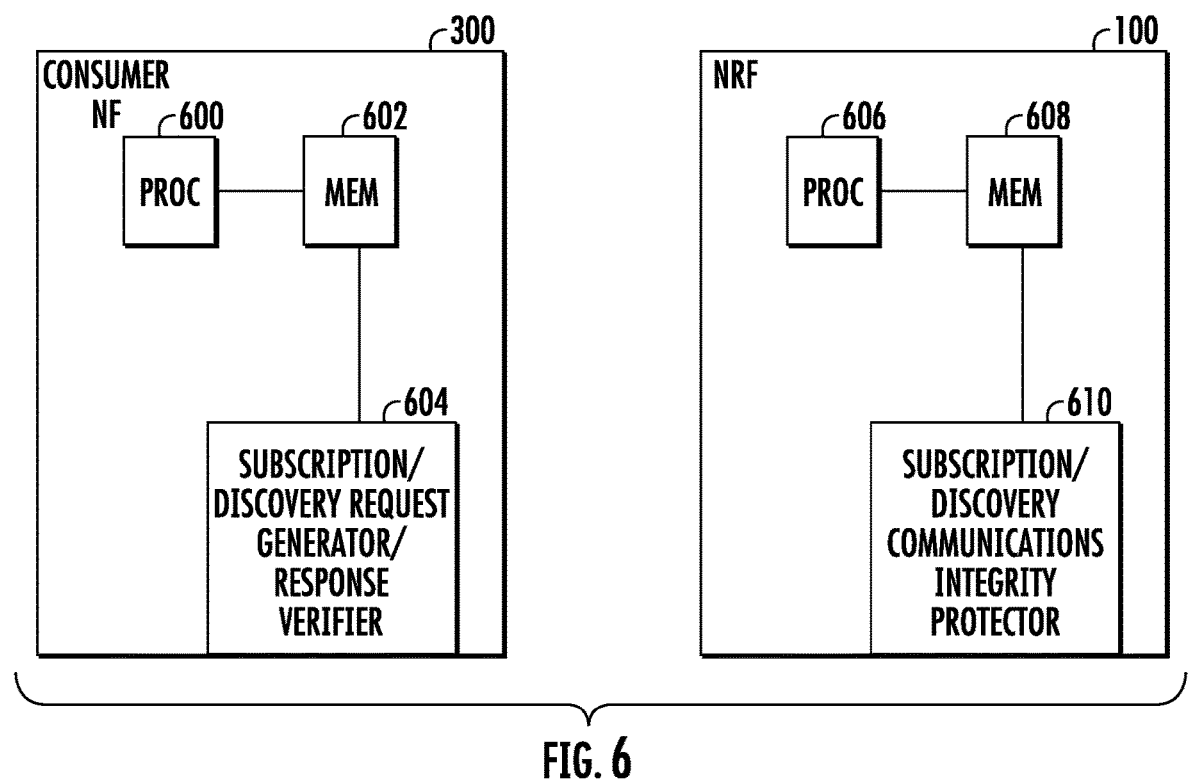
FIG. 6 is a block diagram illustrating exemplary architectures for an NF and an NRF for providing for integrity protection in subscription/notification and NF discovery transactions.

FIG. 6 is a block diagram illustrating exemplary architectures for an NF and an NRF for providing for integrity protection in subscription/notification and NF discovery transactions. Referring to FIG. 6, NF 300 includes at least one processor 600 and a memory 602. NF 300 further includes a subscription/discovery request generator/response verifier 604 implemented by processor 600 for performing the NF functions described herein for requesting and implementing integrity protection in communications with the NRF. These functions include requesting signed notifications and discovery responses, generating signed hashes of portions of NF discovery and subscription request messages, and validating digital signatures in subscription responses, NF discovery responses, and notification request messages.

NRF 100 includes at least one processor 606 and a memory 608. NRF 100 further includes a subscription/discovery communications integrity protector 610 implemented by processor 606 for performing the NRF-side functions described herein for protecting the integrity of communications with NFs. Such functions include receiving, from the NF, a subscribe or discovery request message, determining that the subscribe or discovery request message includes at least one indicator for NRF communications integrity protection. In response to determining that the subscribe or discovery request includes at least one indicator for NRF communications integrity protection, subscription/discovery communications integrity protector 610 computes an integrity check value of at least a portion of the subscribe or discovery request message and compares the computed integrity check value to an integrity check value included in the subscribe or discovery request message. If subscription/discovery communications integrity protector 610 determines that the computed integrity check value matches the integrity check value included in the subscribe or discovery request message, subscription/discovery communications integrity protector formulates a response message to the subscribe or discovery request message, generates at least one digital signature, adds the digital signature to the response message, and transmits the response message to the NF. In one example, the integrity check value comprises a hash value created using a hash function.

Figure 7:
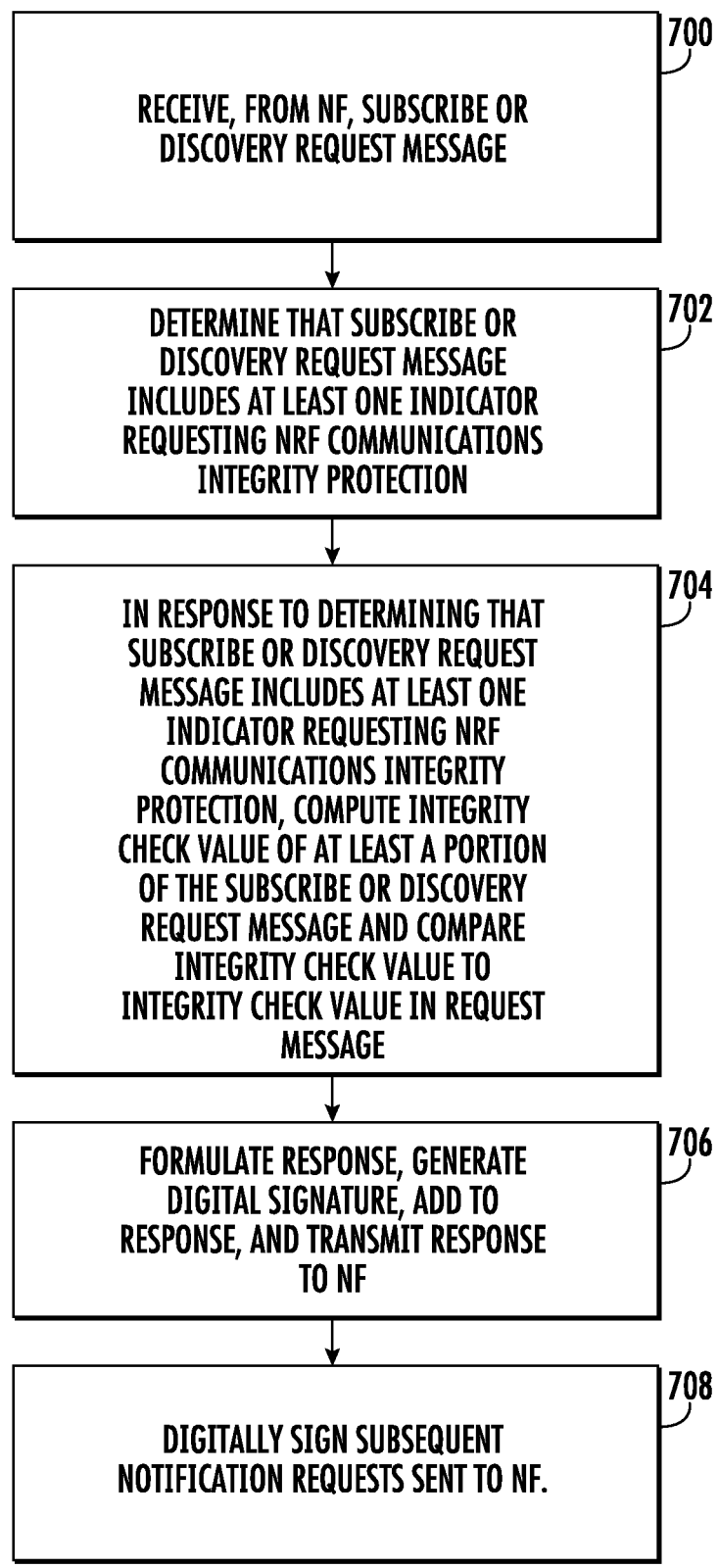
FIG. 7 is a flow chart illustrating an exemplary process for integrity protection in subscription/notification and NF discovery transactions.

FIG. 7 is a flow chart illustrating an exemplary process for integrity protection for subscribe/notify and NF discovery transactions between an NF and an NRF. Referring to FIG. 7, in step 700, the process includes receiving, from the NF, a subscribe or discovery request message. For example NRF 100 may receive an NF status subscribe request or NF discovery request from a consumer NF or SCP.

In step 702, the process includes determining that the subscribe or discovery request includes at least one indicator requesting NRF communications integrity protection. For example, NRF 100 may determine that the NF discovery request or the NF status subscribe message includes the vendor_request_signing and vendor_request_hash custom headers.

In step 704, the process includes, in response to determining that the subscribe or discovery request message includes at least one indicator requesting NRF communications integrity protection, computing an integrity check value of at least a portion of the subscribe or discovery request message and comparing the computed integrity check value to an integrity check value included in the subscribe or discovery request message. For example, in the case of an NF status subscribe message, NRF 100 may compute a hash of the message body and compare the hash to the hash in the vendor_request_hash custom header. In the case of an NF discovery request message, NRF 100 may compute the hash of the query parameters in the NF discovery request message and compare the hash to the hash included in the vendor_request_hash custom header.

In step 706, the process includes determining that the computed integrity check value matches the integrity check value included in the subscribe or discovery request message, and, in response, formulating a response to the subscribe or discovery request message, generating at least one digital signature, adding the at least one digital signature to the response message, and transmitting the response message to the NF. If the response is a subscription response, the NRF may generate the vendor_signed_request header with the digital signature of the hash from the subscription request, and send the response to the consumer NF. If the response is an NF discovery response, the NRF may generate the vendor_signed_request header with the digital signature of the hash from the NF discovery request and the vendor_signed_body header with the digital signature of the hash of the NF discovery response body.

In step 708, the process includes, for the case in which signed responses were requested by the consumer NF, digitally signing subsequent notification requests transmitted to the NF. For example, for each notification request transmitted to a consumer NF that requested signed responses, NRF 100 may digitally sign the hash of the notification request message body and include the digital signature in the vendor_signed_body header transmitted with the notification request message to the consumer NF.

The following are reasons why the integrity protection measures described herein reduce the likelihood of successful attacks in communications between the NRF and NFs.

1. If a hacker/proxy tries to modify the subscriptionData (for a subscription request) or the discovery parameters (for a discovery request), then the consumer NF can detect such modifications by comparing the signed vendor_request_hash re-published by the NRF in the subscription or discovery response.

2. If a hacker/proxy tries to modify any content of notification/discovery data from the NRF, then the hash value of response message body will change. Hence, the validation of the digital signature of the hash of the message body will fail at the consumer NF.
3. If a hacker/proxy tries to generate false notification requests towards NF, the hacker/proxy will not be able to generate a valid signed notification request without the private key of the real NRF. Thus, the hacker would not be able to apply false notifications at an NF supporting the integrity protection mechanisms described herein.

Exemplary feature/advantages of the subject matter described herein include:

The subject matter described herein provides integrity protection of subscription requests, discovery requests, notification requests and discovery responses between the NRF and the consumer NF. Thus, the subject matter described herein functions as a guard against any kind of intrusion on request and response flow between the NF and the NRF.

The subject matter described herein can be enhanced to apply for registration and access-token request/response flows between the NF and the NRF.

When a cross-certification process is established between the two PLMNs, the subject matter described herein works for the signing of notification requests and discovery responses across PLMNs as well.

NRF only generates signed notification requests or discovery responses for NFs that requested signed responses in a subscription or discovery request. As a result, the behavior of the NRF remains unchanged, unless consumer NF expressly request signed notification requests and discovery responses.

Because the NF expressly controls the support to request for signed messages from the NRF, the network operator can choose to selectively enable and disable support for signed messages from the NRF on a per-NF basis.

If the NRF manages a separate key pair for each NfInstance/NfType/Locality etc., then the subject matter described herein works for NFs that are registered at NRF. If an endpoint tries to subscribe without being registered with the NRF, then the NRF cannot determine the private key to be used for signing notifications towards such instances. Thus, an NF that does not have a registered profile at the NRF may not request a signed message flow from the NRF.

The NF may be configured to request a signed message flow only if operator has all NRFs (in the home PLMN) supporting the integrity protection functionality described herein. Otherwise, if a given NRF does not support signing, then any notification request or discovery response generated by the NRF will be rejected by NF(s) that performs validation for a signed flow from the NRF.

The disclosure of each of the following references is hereby incorporated herein by reference in its entirety.

REFERENCES 1. 3$^{rd}$ Generation Partnership Project; Technical Specification Group Services and System Aspects; Security architecture and procedures for the 5G system (Release 17) 3GPP TS 33.501 V17.4.2 (2022-01)
2. 3$^{rd}$ Generation Partnership Project; Technical Specification Group Services and System Aspects; Network Domain Security (NDS); Authentication Framework (AF) (Release 17) 3GPP TS 33.310 V17.1.0 (2021-12)
3. 3$^{rd}$ Generation Partnership Project; Technical Specification Group Core Network and Terminals; 5G System; Network Function Repository Services; Stage 3 (Release 17) 3GPP TS 29.510 V17.4.0 (2021-12)
4. Hardt, D., The OAuth 2.0 Authorization Framework, IETF RFC 6749 (October 2012).
5. Jones et al., JSON Web Signature (JWS) IETF RFC 7515 (May 2015)
6. Jones et al., JSON Web Token (JWT), IETF RFC 7519 (May 2015)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for integrity protection for subscribe/notify and network function (NF) discovery transactions between an NF and an NF repository function (NRF), the method comprising:

at the NRF:

receiving, from the NF, a subscribe or discovery request message;

determining that the subscribe or discovery request message includes at least one indicator requesting NRF communications integrity protection;

in response to determining that the subscribe or discovery request message includes the at least one indicator requesting NRF communications integrity protection, computing an integrity check value of at least a portion of the subscribe or discovery request message and comparing the computed integrity check value to an integrity check value included in the subscribe or discovery request message; and determining that the computed integrity check value matches the integrity check value included in the subscribe or discovery request, and, in response, formulating a response message to the subscribe or discovery request message, generating at least one digital signature, adding the at least one digital signature to the response message, and transmitting the response message to the NF, wherein the at least one indicator requesting NRF communications integrity protection includes a custom vendor_request_signing header having a value indicating that the NE expects digitally signed response messages and generating the at least one digital signature includes generating the at least one digital signature in response to the vendor_request_signing header, wherein generating the at least one digital signature includes generating a first digital signature of the integrity check value received in the NF discovery request message from the consumer NF and a second digital signature of a body of the NF discovery response message.

2. The method of claim 1 wherein receiving the subscribe or discovery request message includes receiving an NF status subscribe message, formulating the response message includes formulating an NF status subscribe response message and generating the at least one digital signature includes digitally signing the integrity check value received in the NF status subscribe message from the consumer NF.

3. The method of claim 2 comprising, at the NRF, detecting an event requiring notification to the NF, generating a notification request message and including, in the notification request message, a digital signature of a body of the notification request message.

4. The method of claim 1 wherein receiving the subscribe or discovery request message includes receiving an NF discovery request message, formulating the response message includes formulating an NF discovery response message.

5. The method of claim 1 wherein the at least one indicator requesting NRF communications integrity protection includes a custom vendor_request_hash header containing the integrity check value and an identifier of an integrity check algorithm used to create the integrity check value.

6. The method of claim 5 wherein the integrity check algorithm comprises a hash algorithm.

7. The method of claim 1 wherein generating the at least one digital signature includes generating the digital signature using a private key of the NRF that the NRF uses for OAuth 2.0 authorization.

8. The method of claim 1 wherein generating the at least one digital signature includes generating the digital signature using a private key that is paired with a public key of a public-private key pair specific to the NF.

9. The method of claim 1 wherein receiving the subscribe or discovery request message includes receiving the subscribe or discovery request from a different public land mobile network (PLMN) from the NRF and wherein generating the at least one digital signature includes generating the at least one digital signature using a private key of a private-public key pair used to secure inter-PLMN communications.

10. A system for integrity protection for subscribe/notify and network function (NF) discovery transactions between an NF and an NF repository function (NRF), the system comprising:
an NRF including at least one processor for receiving a subscribe or discovery request message; and
a subscription/discovery communications integrity protector implemented by the at least one processor for determining that the subscribe or discovery request message includes at least one indicator requesting NRF communications integrity protection, in response to determining that the subscribe or discovery request message includes the at least one indicator requesting NRF communications integrity protection, computing an integrity check value of at least a portion of the subscribe or discovery request message, comparing the computed integrity check value to an integrity check value included in the subscribe or discovery request message, determining that the computed integrity check value matches the integrity check value included in the subscribe or discovery request message, and, in response, formulating a response message to the subscribe or discovery request message, generating at least one digital signature, adding the at least one digital signature to the response message, and transmitting the response message to the NF,
wherein the at least one indicator requesting NRF communications integrity protection includes a custom vendor_request_signing header having a value indicating that the NF expects digitally signed response messages and generating the at least one digital signature includes generating the at least one digital signature in response to the vendor_request_signing header,
wherein generating the at least one digital signature includes generating a first digital signature of the integrity check value received in the NF discovery request message from the consumer NF and a second digital signature of a body of the NF discovery response message.

11. The system of claim 10 wherein the subscribe or discovery request message includes an NF status subscribe message, the response message includes an NF status subscribe response message, and the at least one digital signature includes a digital signature of the integrity check value received in the NF status subscribe message from the consumer NF.

12. The system of claim 11 wherein the NRF is configured to detect an event requiring notification to the NF and generate a notification request message and the subscription/discovery communications integrity protector is configured to include, in the notification request message, a digital signature of a body of the notification request message.

13. The system of claim 10 wherein the subscribe or discovery request message includes an NF discovery request message, the response message includes an NF discovery response message.

14. The system of claim 10 wherein the at least one indicator requesting NRF communications integrity protection includes a custom vendor_request_hash header containing the integrity check value and an identifier of a hash algorithm used to create the integrity check value.

15. The system of claim 10 wherein the subscription/discovery communications integrity protector is configured to generate the at least one digital signature using a private key of the NRF that the NRF uses for OAuth 2.0 authorization.

16. The system of claim 10 wherein the subscription/discovery communications integrity protector is configured to generate the at least one digital signature using a private key that is paired with a public key of a public-private key pair specific to the NF.

17. The system of claim 10 the subscribe or discovery request message originates from a different public land mobile network (PLMN) from the NRF and wherein the subscription/discovery communications integrity protector is configured to generate the at least one digital signature using a private key of a public-private key pair used to secure inter-PLMN communications.

18. A non-transitory computer readable medium having stored thereon executable instructions that when executed by a processor of a computer control the computer to perform steps comprising:
at a network function (NF) repository function (NRF):
receiving, from an NF, a subscribe or discovery request message;
determining that the subscribe or discovery request message includes at least one indicator requesting NRF communications integrity protection;
in response to determining that the subscribe or discovery request message includes the at least one indicator requesting NRF communications integrity protection, computing an integrity check value of at least a portion of the subscribe or discovery request and comparing the computed integrity check value to an integrity check value included in the subscribe or discovery request message; and
determining that the computed integrity check value matches the integrity check value included in the subscribe or discovery request message, and, in response, formulating a response message to the subscribe or discovery request message, generating at least one digital signature, adding the at least one digital signature to the response, and transmitting the response message to the NF, wherein the at least one indicator requesting NRF communications integrity protection includes a custom vendor request signing header having a value indicating that the NF expects digitally signed response messages and generating the at least one digital signature includes generating the at least one digital signature in response to the vendor request signing header, wherein generating the at least one digital signature includes generating a first digital signature of the integrity check value received in the NF discovery request message from the consumer NF and a second digital signature of a body of the NF discovery response message.

* * * * *